United States Patent Office 3,418,809
Patented Dec. 31, 1968

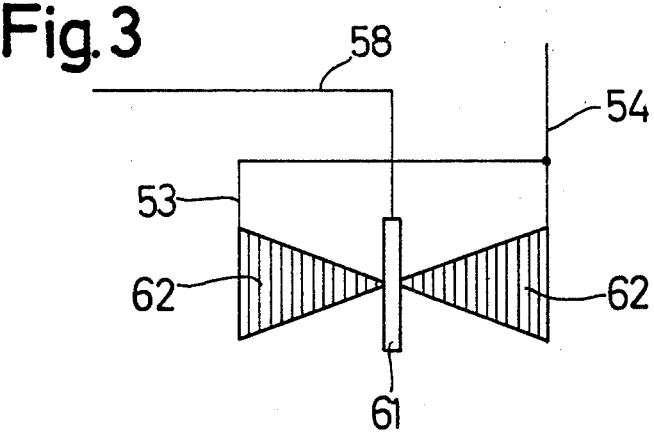
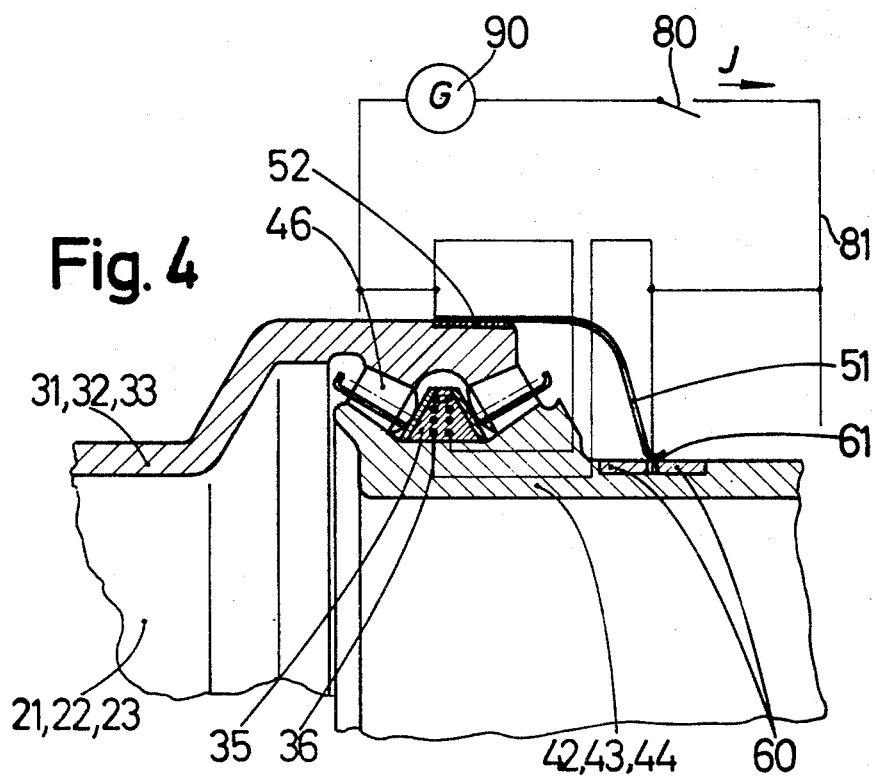

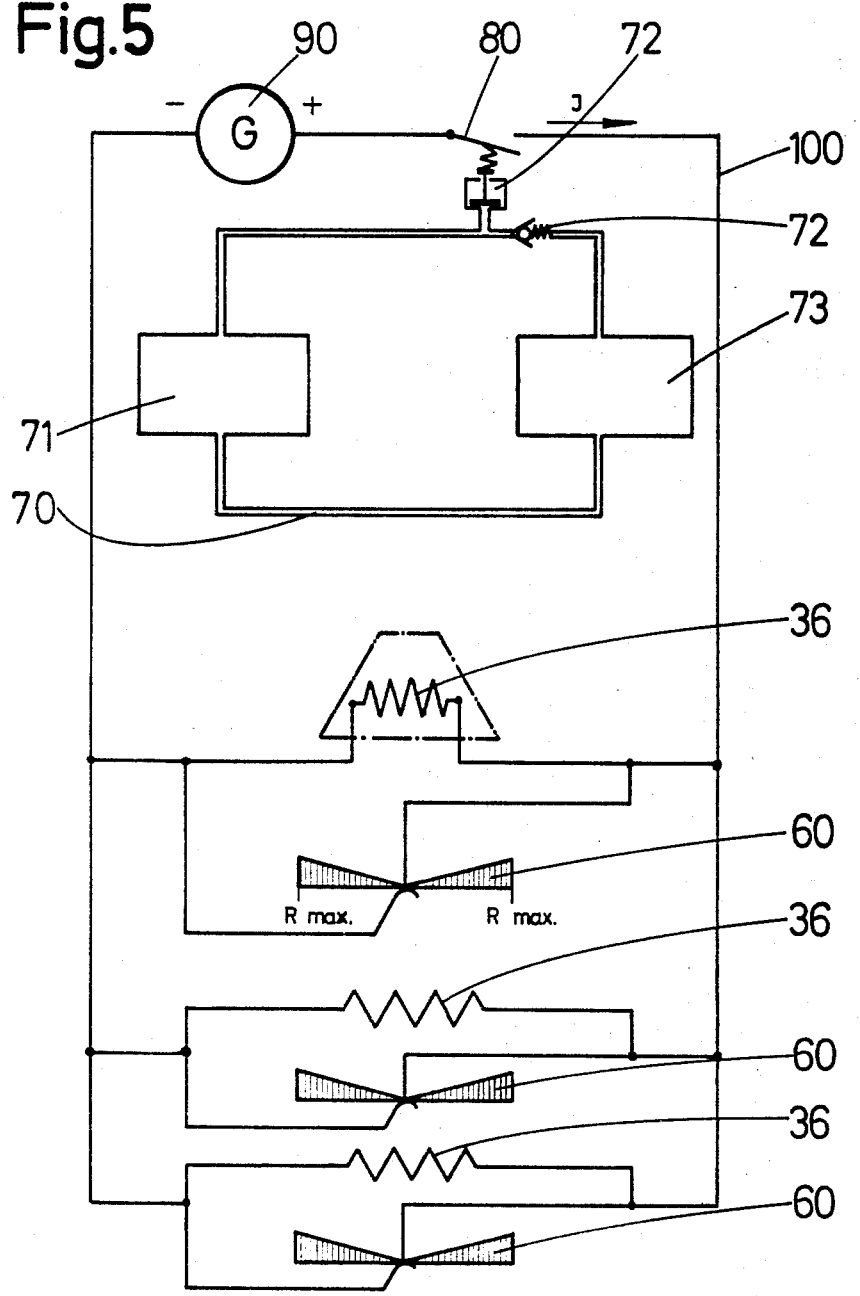

3,418,809
ROTATABLE JET NOZZLE WITH AUTOMATIC COMPENSATION FOR BEARING PLAY
Gerhard Kopp, Munich, Germany, assignor to Entwicklungsring Sud G.m.b.H., a corporation of Germany
Filed June 6, 1967, Ser. No. 643,999
Claims priority, application Germany, June 27, 1966, E 31,929
8 Claims. (Cl. 60—232)

ABSTRACT OF THE DISCLOSURE

An antifriction bearing between tube segments wherein one of the races thereof is mounted on an expansion member which expands and contracts in response to detected variations in bearing play caused by wide temperature variations.

---

In my co-pending application Ser. No. 640,863, filed May 24, 1967, an arrangement is described in which, at each tube segment, a hinged bar or similar body suitable for linear expansion, together with a control ring, one or more actuating elements and possibly another transmission element, forms a drive chain for the displacement of the bearing race(s) in order to perform an automatic compensation for the bearing play.

This invention is based on a similar arrangement and concerns antifriction bearings with an arrangement for the temperature dependent adjustment of the bearing play. In the instant construction, an expansion body is heated electrically and is in operating connection with a switch for the automatic adjustment of the heating temperature via contacts as well as a measuring and control device, so that the on-and-off switching of the heating wires and the continuous change of the heating power are directly determined by the amount of continuously measured bearing play. Every radial play of the tube pieces involves an axial play and these movements are used for adjusting and controlling a compensation movement.

In a refinement of the invention, the suggestion is made to provide an electrically heatable expansion body with steel buffer discs which directly act upon a roll body. The wearing of the expansion body can be thus prevented. In one configuration of the invention provision is made, for the providing of the beginning of each rotatable tube segment with antifriction bearing surfaces and a measuring and control device which cooperates with the expansion bodies and contact bows arranged at the end of the preceding tube segment. In this design the inner and outer bearing races are eliminated thus permitting a decrease in the total height of the jet deflector. At the same time, a saving in weight is involved. In addition only the antifriction bearing rollers themselves are shifted by the measures of the invention. For this purpose a special embodiment of the invention is particularly suitable wherein a radially fixed expansion body can be moved in an axial direction.

Another objective of the invention is to provide for the use of a variable resistor as measuring and control means. Thus, a simple and inexpensive combination is obtained for the continuous heating of the expansion body in accordance with the respective condition of bearing play. In another embodiment, the provision is made of arranging a hydraulic or pneumatic pump driven by the jet engine for pre-heating the heating coils, and a pressure body for the switch of the D.C. mains.

These and other objects of the invention will become more apparent to those skilled in the art by reference to the following detailed description when viewed in light of the accompanying drawings, wherein:

FIGURE 3 is a schematic-diagrammatic representation of the measuring and control means for an arrangement according to FIGURES 1 and 2;

FIGURE 4 is a partial longitudinal section of an embodiment of the invention; and FIGURE 5 is a wiring diagram of a D.C. circuit for heating the expansion body with an automatically variable resistor for the embodiment of FIGURE 4.

Figure 1:
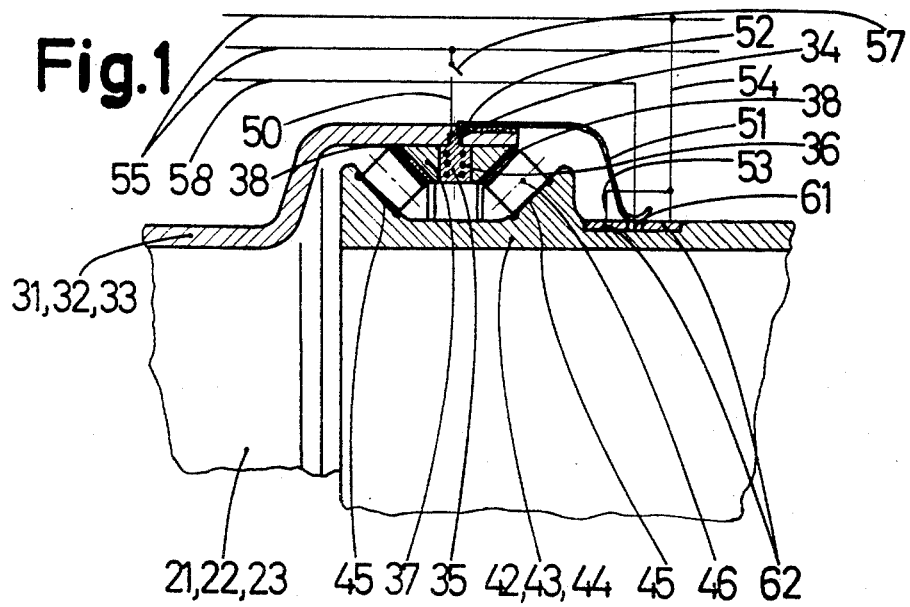
FIGURE 1 is a partial longitudinal section of the invention.

Referring now to the drawings wherein like parts are referred to by like numerals, the jet deflector 20 of a jet engine 10 includes a plurality of tube bodies 21, 22, 23, and 24. These are arranged in such a manner that the tube ends 31, 32, 33 in jet direction overlap respectively with the initial piece 42, 43 and 44 of the adjacent tubes 22, 23 and 24. In grooves 34 at the tube ends 31, 32 and 33 expansion bodies 35 are arranged which carry steel buffer discs 38 at spacers 37. Only the connection between tube bodies 31 and 32 will be explained in detail. The discs and spacers are designed and arranged to take over the function of a bearing race. For this reason, the spacers 37 and the steel buffer discs 38 are movable in an axial direction but are protected against radial torsion by design. The expansion body 35 and its heating wires 36 are connected with a contact bow 51 via an electrical lead 50. This contact bow 51 is biased against an insulation plate and constitutes the functional element of a variable resistor 60 or of a sliding contact 62 ahead of which there is a rest contact 61.

Figure 2:
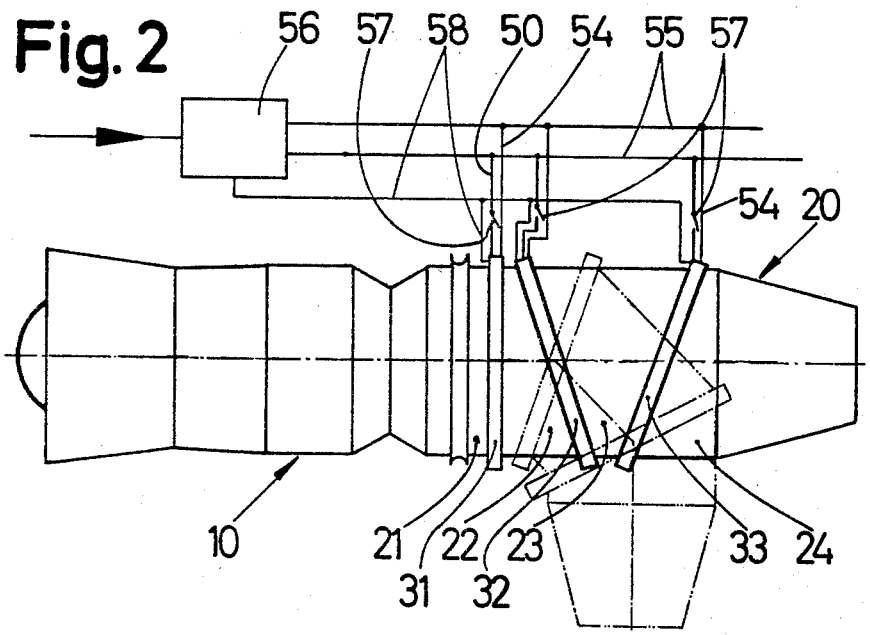
FIGURE 2 is a schematic-diagrammatic representation of a jet deflector and its electric wiring wherein the jet direction deflected by 90° is indicated by a broken line.

The resistor 60 and its corresponding rest contact 61 are attached to the tube bodies 22, 23, and 24, the initial pieces 42, 43 and 44 of which are provided with roller bearing surfaces 45 for the rollers 46. Thus, a second bearing race also becomes unnecessary. The resistor 60 or the sliding contact 62 and the heating wires 36 of the expansion bodies 35, are connected to the airborne electrical supply system 55 via leads 50, 53 and 54. At the same time a relay 56 (FIGURE 2) which responds to the switches 57 is connected to the airborne supply system. The switches 57 of the circuits 50, 54 and 55 for heating the expansion bodies 37, are automatically opened by means of the contacts 61 which are connected with the relay 56 via the leads 58. In the case of a bearing play towards zero, the contact bow 51 rests on the rest contact 61, which makes the relay 56 operate and maintains switches 57 open. Thus, the circuit for the respective expansion body 35 remains interrupted because the heating wires 36 in the expansion body 35 are without voltage.

In normal operation with the deflector bearings at rest, there is a certain bearing play. An automatic centering of the tube segments is caused by the axial component corresponding to thrust reaction. When the heating of the tube bodies 21, 22, 23 and 24 increases axial expansion as well as a radial expansion takes place. The expansion of the initial pieces 42, 43, and 44 of the tube bodies 21, 22, 23 and 24, however, will be greater than that of the tube end pieces 31, 32 and 33. Therefore, a greater play occurs in the antifriction bearings 38, 45, and 46. In the case of a deflecting process, this greater play is detrimental as far as the actuating gear and clearances are concerned. For this reason, the automatic bearing play adjustment is switched on. As the bearing play increases, the contact bow 51 leaves the rest contact 61, causing the relay 56 to respond and to thus close the switch 57 of the lines 50, 54 and 55 and starts the heating of the expansion body 35. The resistor 60 which is adjustable by means of the contact bow 51, or the sliding contact 62, controls the degree of heating to thus compensate for bearing play.

The heating is automatically terminated when the contact bow 51 again lies on the rest contact 61 and the relay 56 once more opens the respective switch 57 to interrupt the heating circuit. Thus, a simple automatic compensation for bearing play is generated which is free from maintenance and is achieved without many components.

In another embodiment of the invention as shown in FIGURES 4 and 5, provision is made for the arrangement of the electrically heatable expansion body 35 that is also furnished with heating wires 36 and steel buffer discs 38, in such a manner that the body is radially stationary, but axially movable or floating. In this configuration a primary circuit 70 is supplied with a corresponding medium by a hydraulic pump 71 driven by the jet engine 10. In the case of a certain pressure, the pressure body 72 responds and closes a switch 80 of the secondary circuit 100 which is supplied by a generator 90. Thus, the heating coils 36 are already pre-heated. When the pressure of the medium increases to a certain degree, the relief valve 72 opens and releases the actuation of the driving motor 73 for the jet deflector 20. So far as time is concerned, the two circuits 70 and 100 are arranged to cooperate in such a manner that the heating coils 36 are pre-heated when the relief valve 72 is opened, so that they cause compensation for the bearing play to the fullest extent.

What is claimed is:

1. Antifriction bearings for use between tube segments of a jet deflector of a jet engine wherein a first segment end is received within a second segment end wherein the improvement comprises a first bearing surface on said first end, an expansion body carried interiorly of said second segment end, a second bearing surface on said expansion body in opposed relationship to said first surface and at a selected distance from said first surface for desired bearing play, bearings between said surfaces, first means to expand said body, and second means for detecting a variation in bearing play from said desired bearing play and third means for expanding said body in response to said variation from desired bearing play.

2. The antifriction bearings according to claim 1 wherein said first means are electrical heat coils within said body.

3. The antifriction bearing according to claim 1 wherein a steel buffer disc is disposed between said bearing and said expansion body.

4. The antifriction bearings according to claim 2 wherein said third means includes a switch which connects said heat coils to an electrical power source upon a variation in bearing play and an electrical control for controlling the current to said coils in proportion to the extent of the variation in said bearing play.

5. The antifriction bearing according to claim 2 wherein said expansion body is radially stationary and movable axially.

6. The antifriction bearing according to claim 4 wherein said control includes variable resistor mounted on one tube segment and an arm in engagement therewith mounted on the other of said tube segments.

7. The antifriction bearing according to claim 1 wherein said first means includes a hydraulic pump driven by said jet engine for actuating said third means.

8. The antifriction bearing according to claim 1 wherein said first means includes a pneumatic pump driven by said jet engine for actuating said third means.

References Cited

UNITED STATES PATENTS

| | | | |
|---|---|---|---|
| 1,982,265 | 11/1934 | Nenninger. | |
| 3,106,432 | 10/1963 | Opferkuch | 308—70 |
| 3,311,431 | 3/1967 | Hilliard | 308—189 |
| 3,313,581 | 4/1967 | Kusakabe | 308—189 |
| 3,341,229 | 9/1967 | De Wilde | 285—184 |
| 3,361,498 | 1/1968 | Cook | 308—189 |

CARLTON R. CROYLE, *Primary Examiner.*

U.S. Cl. X.R.

60—39.32; 308—207, 189; 285—41, 184, 187; 239—265.35